US006626784B1

(12) United States Patent
Sedlacek

(10) Patent No.: US 6,626,784 B1
(45) Date of Patent: Sep. 30, 2003

(54) LOW MODULUS BELT

(75) Inventor: Douglas R. Sedlacek, Englewood, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/996,436

(22) Filed: Nov. 28, 2001

(51) Int. Cl.[7] .............................. F16G 1/04; B65G 15/34
(52) U.S. Cl. ..................... 474/261; 474/266; 474/237; 156/137; 198/847
(58) Field of Search ................. 474/262, 261, 474/267, 271, 260, 263, 265, 237, 266; 198/847, 846; 152/535, 538, 532; 156/85, 536, 242; 139, 137

(56) References Cited

U.S. PATENT DOCUMENTS

| 2,983,637 | A | | 5/1961 | Schmidt ................. 154/52.1 |
| 3,212,627 | A | | 10/1965 | Beebee ................. 198/193 |
| 3,820,409 | A | * | 6/1974 | Meadows ................. 474/261 |
| 3,863,515 | A | | 2/1975 | Meadows ................. 74/231 |
| 3,911,755 | A | | 10/1975 | Vance, Sr. ................. 74/231 R |
| 3,919,018 | A | * | 11/1975 | Schroeder ................. 156/85 |
| 3,924,482 | A | | 12/1975 | Meadows ................. 74/234 |
| 3,941,005 | A | * | 3/1976 | Gardiner et al. ................. 474/262 |
| 4,215,589 | A | | 8/1980 | Howerton ................. 474/62 |
| 4,229,254 | A | | 10/1980 | Gill ................. 162/358 |
| 4,305,713 | A | | 12/1981 | Imamura ................. 474/238 |
| 4,595,388 | A | | 6/1986 | Tangorra ................. 474/204 |
| 4,650,068 | A | * | 3/1987 | Vanassche et al. ................. 474/271 |
| 4,990,125 | A | * | 2/1991 | Stuemky et al. ................. 474/261 |
| 5,624,515 | A | * | 4/1997 | Onoe et al. ................. 156/148 |
| 6,033,331 | A | | 3/2000 | Winninger et al. ................. 474/260 |
| 6,161,684 | A | | 12/2000 | David ................. 198/847 |
| 6,176,799 | B1 | | 1/2001 | Kinoshita et al. ................. 474/237 |

FOREIGN PATENT DOCUMENTS

| EP | 0 285 072 | | 10/1988 | ............. F16G/1/08 |
| EP | 0 380 064 B1 | | 4/1994 | |
| EP | 0625650 A1 | * | 11/1994 | |
| EP | 0 625 650 | | 11/1994 | ............. F16G/5/20 |
| GB | 1380957 | * | 1/1975 | |
| JP | 60-50003 A | * | 3/1985 | |
| JP | 08-246288 A | * | 9/1996 | |

* cited by examiner

*Primary Examiner*—Marcus Charles
(74) *Attorney, Agent, or Firm*—J. A. Thurnau, Esq.; C. H. Castleman, Esq.; S. G. Austin, Esq.

(57) ABSTRACT

A low modulus power transmission belt having a multi-unit cord tensile member. The belt also comprises a low modulus elastomeric body. A multi-unit cord tensile member configuration is plied into the elastomeric body, the tensile cord members having an included angle in the range of 120° to 180° between each ply. The belt having an elastic modulus of less than 1,500 N/mm and having an elongation of approximately 6.8% over a load range of approximately 0–350 newtons.

21 Claims, 3 Drawing Sheets

LOW MODULUS BELT

FIELD OF THE INVENTION

The invention relates to a power transmission belt and more particularly to a low modulus power transmission belt.

BACKGROUND OF THE INVENTION

Power transmission belts are widely used to transmit rotary power. The belt is generally installed between a driver and driven pulley, such as in the case of an accessory belt drive on a vehicle engine.

The belt comprises a tensile cord embedded in an elastomeric material. The tensile cord, or cords, are oriented parallel to a longitudinal axis in order to maximize a load carrying capability. The tensile cord is wound on a belt build in a continuous manner during fabrication.

Power transmission belts must possess sufficient tensile strength to allow a required torque, and load, to be transmitted between pulleys.

A belt having a high tensile strength also will generally have a commensurately high modulus. A belt having a high modulus will be relatively stiff and subject to higher operating temperatures. Further, installation of a prior art high modulus belt requires moveable pulleys.

A low modulus belt may be used in situations were the torque to be transmitted is relatively low. Low modulus belts are fabricated using tensile cords having little or no preload, or, are fabricated using tensile cords having a twist that allows for a predetermined elongation under load.

Representative of the art is EP 0 625 650 to Gates that discloses a low modulus belt having a tensile cord wound with a preload in a longitudinal direction.

Also representative of the art is U.S. Pat. No. 4,229,254 to Gill (1980) which discloses a belt having a reinforcing structure having two plies of cords extending in cross bias layers.

Further representative of the art is U.S. Pat. No. 6,033,331 to Winninger et al. (2000) which discloses a belt having a supporting structure such that the belt exhibits an average stress-elongation slope ranging from 12 to 20 daN/% of elongation per width centimeter.

The prior art teaches use of tensile cords that are wound in a longitudinal direction for bearing a tensile load. The art also teaches low modulus belts having a relatively moderate to high modulus.

What is needed is a low modulus belt having a multi-unit cord tensile member. What is needed is a low modulus belt having a woven fabric tensile member. What is needed is a low modulus belt having a tensile member describing a pantographic form. What is needed is a low modulus belt having a modulus less than 1,500 N/mm. The present invention meets these needs.

SUMMARY OF THE INVENTION

The primary aspect of the invention is to provide a low modulus belt having a multi-unit cord tensile member.

Another aspect of the invention is to provide a low modulus belt having a woven fabric tensile member.

Another aspect of the invention is to provide a low modulus belt having a tensile member describing a pantographic form.

Another aspect of the invention is to provide a low modulus belt having a modulus less than 1,500 N/mm.

Other aspects of the invention will be pointed out or made obvious by the following description of the invention and the accompanying drawings.

The invention comprises a low modulus power transmission belt having a multi-unit cord tensile member. The belt also comprises a low modulus elastomeric body. A multi-unit cord tensile member configuration is plied into the elastomeric body, the tensile cord members having an included angle in the range of 120° to 180° between each ply. The belt having an elastic modulus of less than 1,500 N/mm and having an elongation of approximately 6.8% over a load range of approximately 0–350 newtons.

BRIEF DESCRIPTION OF THE DRAWINGS

The accompanying drawings, which are incorporate in and form a part of the specification, illustrate preferred embodiments of the present invention, and together with a description, serve to explain the principles of the invention.

DETAILED DESCRIPTION OF THE PREFERRED EMBODIMENT

Figures 1, 2, 3:
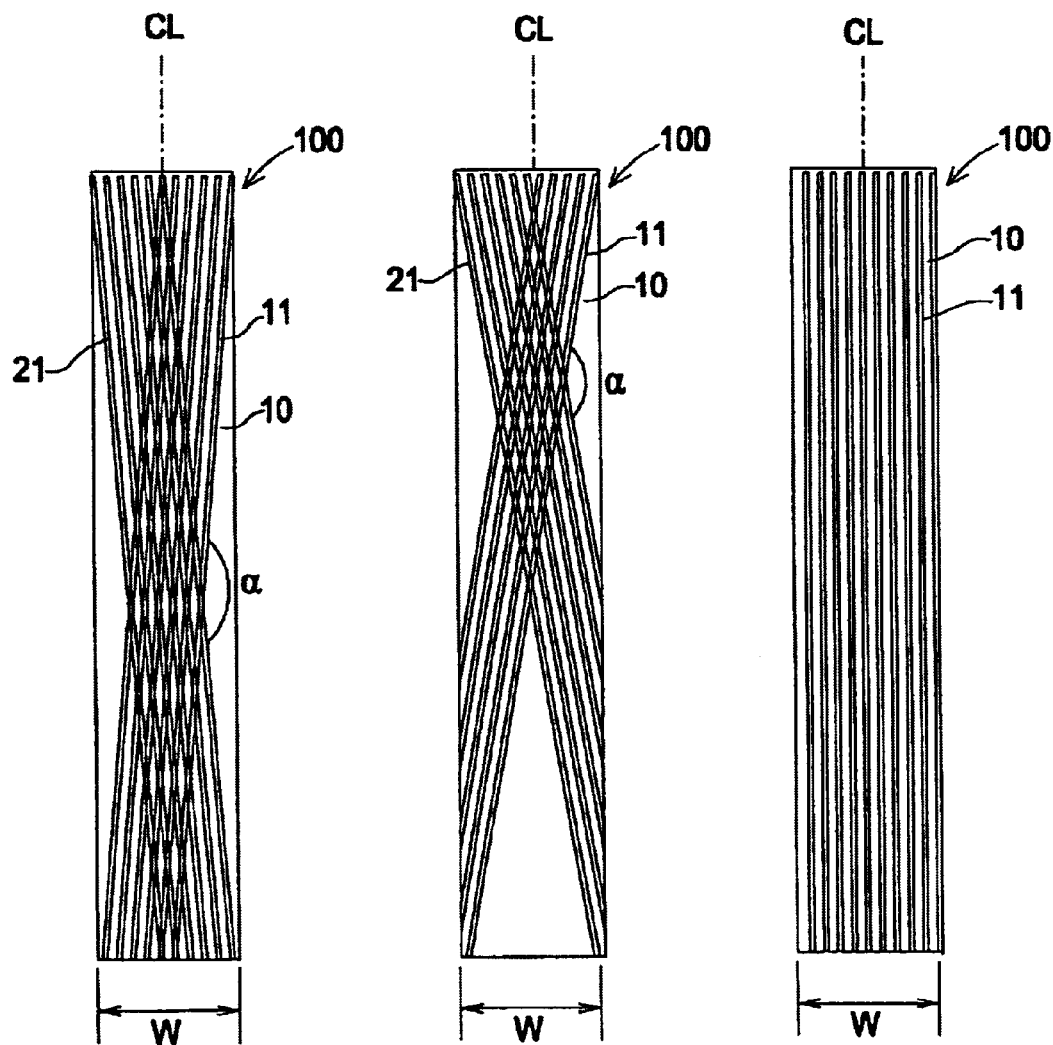
FIG. 1 is a plan view of a belt showing a tensile cord arrangement.
FIG. 2 is a plan view of a belt showing a tensile cord arrangement.
FIG. 3 is a plan view of a belt showing a tensile cord arrangement.

FIG. 1 is a plan view of a belt showing a tensile cord arrangement. The inventive belt comprises a low modulus. A low modulus allows a belt to have a higher flexibility. Flexibility determines, in part, how much a belt temperature will increase during operation. Since the inventive low modulus belt comprises a belt having a relatively high flexibility, a relatively lower operating temperature is realized. This in turn significantly increases a belt lifespan.

Belt 100 comprises elastomeric body 10 and tensile cords 11 embedded therein. Elastomeric body 10 may comprise EPDM or any other elastomeric composition used in the belt arts including natural rubbers, synthetic rubbers or blends thereof.

In the inventive belt tensile cords 11 and 21 are laid up on a belt build during fabrication such that they form a pantographic shape when viewed in plan. Tensile cords 11 and 21 describe an included angle α. The included angle α is in the range of 0° to 180°, or in the alternative an angle of 0° to 90° as measured from a width W of the belt. The preferred range is 120° to 150°.

Tensile cords 11 and 21 may comprise polyamide 4.6 or polyamide 6.6, or any other cord material known in the belt tensile cord art, including polyester and aramid, cotton, rayon, fiberglass, steel, or blends or combinations of each.

Tensile cords 11 and 21 comprise a plurality of parallel cords, known in the art as multi-unit cords, which are laid up on a banner table so that when the tensile cord layers are applied to the belt build the requisite included angle to a belt centerline CL is obtained. In order to achieve the pantograph form shown in FIG. 1 and FIG. 2 the tensile cord sheets, each having a reciprocal angular relation to a belt centerline CL, are laid up in alternating layers, one on top of the other on the belt build. More particularly, a first multi-unit cord layer 11 having an orientation on a given diagonal to a belt CL is laid into a belt build. Then a second multi-unit cord layer 21 having an opposite orientation to the first multi-unit cord layer is laid into the belt build; thereby establishing the included angle α. Layers of elastomeric are also included in the belt build as is known in the art. The multi-unit cord tensile cord 11 may also be applied to the belt build with the warp yarns running parallel to a belt centerline as shown in FIG. 3.

A multi-unit cord comprises a plurality of parallel cords oriented in a warp direction. It is known in the tire manufacturing arts. Each cord may comprise a twisted or non-twisted strand. A weft yarn having a significantly lower denier than the warp yarns is generally included every 1.0 cm along a length in order to maintain a proper orientation of the warp yarns, although this dimension may vary according to manufacturer. The weft yarns do not affect a belt modulus and may be broken during the fabrication process once the cords are laid up on the belt build. The multi-unit cord comprises a sheet and is applied to a belt build as a sheet. No preload is applied to the tensile cord during the application process to a belt build. Further, the ends of the multi-unit cord sheet once applied to the belt build may be connected at a butt joint, or may be overlapped. The multi-unit cords are not applied in a continuous, wound manner as is the case in a single unit cord belt where the unit cord is spiraled about the belt build.

FIG. 2 is a plan view of a belt showing a tensile cord arrangement. This figure depicts an included angle of 120° between each layer of multi-unit tensile cords. This also equates to an angle of 60° as measured from a width W of the belt.

FIG. 3 is a plan view of a belt showing a tensile cord arrangement.

Figure 4:
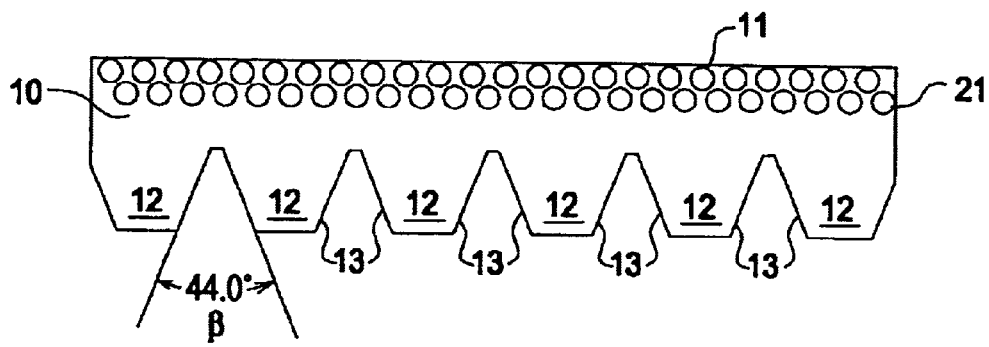
FIG. 4 is an end view of a belt showing a tensile cord arrangement.

FIG. 4 is an end view of a belt showing a tensile cord arrangement. This figure depicts a belt having a first tensile cord layer 11 and second tensile cord layer 21, or plies, of multi-unit cord tensile cords. The profile of the inventive belt is multi-ribbed, comprising ribs 12 spanning a width of the belt. A groove between each rib 12 describes an angle β in the range of 34° to 52°. Ribs 12 may also comprise fibers embedded therein, such as short organic or synthetic fibers which extend from a belt engaging surface 13. Surface 13 further comprises a coefficient of friction.

Figure 5:
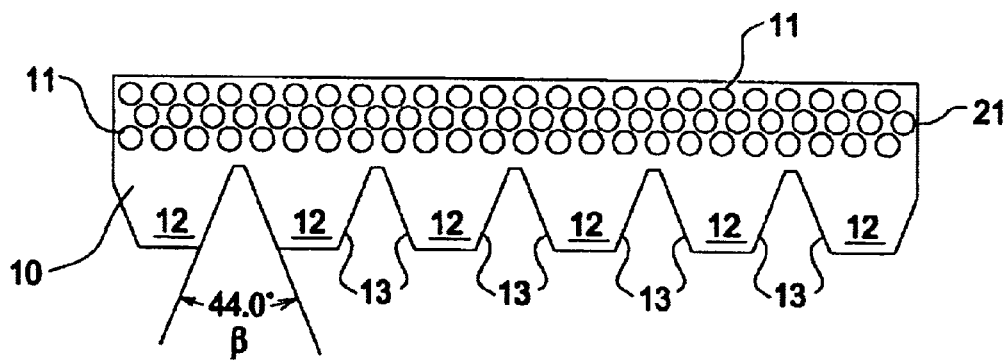
FIG. 5 is an end view of a belt showing a tensile cord arrangement.

FIG. 5 is an end view of a belt showing a tensile cord arrangement. This figure depicts a belt having three plies of multi-unit cord tensile cords. An odd number of plies may be used when applying mill run (included angle=180°) multi-unit cord as shown in FIG. 3 and FIG. 5. Pantograph cord orientations generally require an even number of cords. in order to prevent tracking, as shown in FIG. 1, FIG. 2, FIG. 4 and FIG. 6.

Figure 6:
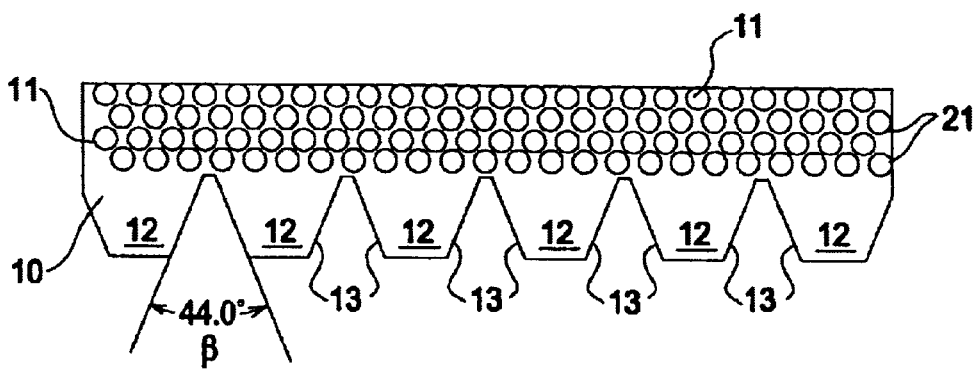
FIG. 6 is an end view of a belt showing a tensile cord arrangement.

FIG. 6 is an end view of a belt showing a tensile cord arrangement. This figure depicts the tensile cord arrangement of a belt having four plies of multi-unit tensile cords.

One can appreciate that the number of tensile cord layers shown in FIGS. 4, 5, and 6 do not limit the number of tensile cord layers which may be used in the inventive belt.

Figure 7:
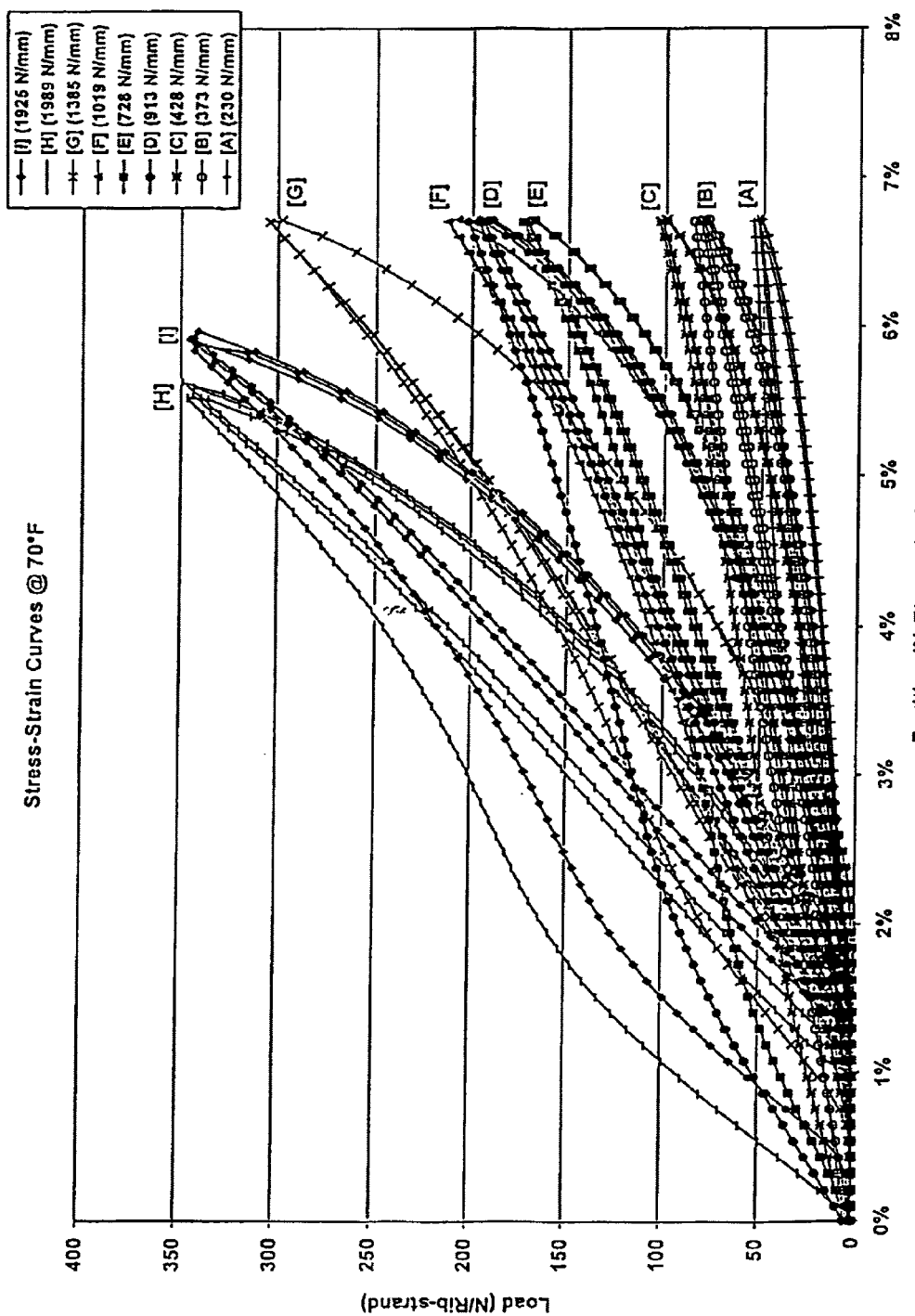
FIG. 7 is a chart depicting the load versus elongation behavior of the inventive belt.

FIG. 7 is a chart depicting the load versus elongation behavior of the inventive belt. The chart comprises stress-strain, or modulus, curves at 70° F. (~23° C.). The chart shows that a belt having two tensile cord plies at an included angle of 120° to each other has the highest elongation to load ratio, 0.13, and therefore the lowest modulus. The belt represented by curve A may stretch up to 6.8% of a length at a load of 50N. The elastic modulus for the belt in curve A is 230 N/mm.

A progression toward a lower elongation to load ratio, with an increase in modulus comprises in part an increase in the number of plies, from 2 to 3 to 4. This also may comprise an increase in the included angle. These are respectively; curve B, 4 plies @ 120° included angle; curve C, 2 plies @ 150° included angle; and curve D, 4 plies @ 150° included angle. Curves E, F, and G correspond to 2, 3, and 4 plies respectively of mill run oriented multi-unit cord. "Mill run" refers to the warp yarns running parallel to a belt centerline. The elastic modulus for each belt is: curve B-373 N/mm; curve C-428 N/mm; curve D-913 N/mm; curve E-728 N/mm; curve F-1019 N/mm; curve G-1385 N/mm. A control belt having a single unit tensile cord orientation (parallel to a belt centerline) has an elastic modulus of 1989 N/mm, shown as curve H, which is significantly higher than the modulus for each of the inventive belts.

The elastic modulus for each belt is determined as follows. Equipment used comprises an Instron™8532 servo-hydraulic tester with digital controller having a 10kN dynamic load cell and a crosshead speed of 10 mm/minute. The belt is mounted on flat steel pulleys which are 108 mm in diameter with free rotation. The test procedure includes inverting the ribbed transmission belt and placing it on the flat pulleys. The belt is initially tensioned just enough to eliminate belt slack. The Instron™ includes test software, more particularly, ElastTest™ software, which is used to load the belt and collect data. Data is collected approximately every 0.25 mm displacement between the pulleys. The test is conducted at a temperature of approximately 23° C. (room temperature). The belt is cycled through three cycles with top elongation of approximately 6.7% elongation. In this case "elongation" is measured as total crosshead movement during the test. For data analysis the data file from the ElastTest™ software includes the belt gage length, number of ribs, crosshead position and the total load. Using this information a stress-strain curve is created for each belt, see FIG. 7. For the elastic modulus value in N/mm, a stress-strain curve average slope is calculated between 1% and 5% on the second and third belt elongation cycle.

Increasing a modulus M comprises increasing the included, or bias, angle from the lower end to the upper end of the range, from 90° to 180°, in combination with the number of plies. An upper end of this angular range is substantially parallel to a belt centerline, CL, having an included angle of 180°. More particularly, the lowest elongation to load ratio (0.023), or relatively higher modulus, for a belt is demonstrated by the construction having 4 plies at an included angle of 180°.

The belts with the lowest elongation to load ratio, or highest elastic modulus, are generally those with the mill run orientation. Each such belt demonstrates a greater load carrying capability for each additional tensile cord ply. These are depicted as curves E, F and G respectively in FIG. 7.

Thus, the modulus of the inventive belt can be specifically designed to meet the needs of a user by adjusting the number of tensile cord plies as well as a tensile cord included angle, or both.

As described above, one skilled in the art can appreciate that the angular range for the tensile members may include up to an orientation parallel to a belt centerline, or 180°. At the other end of the range the limit approaches 90° to a belt centerline, or a substantially transverse orientation or normal to a belt centerline.

In an alternate embodiment the inventive belt may comprise a layer or multiple layers of a woven fabric as a tensile member 11. The woven fabric may comprise aramid, cotton, nylon, polyester, and blends and equivalents thereof. The included angle between the warp yarn and weft yarn in the fabric may vary from approximately 90° to 150°. The woven fabric is applied to a belt build during fabrication so an included angle is bisected by a line normal to a belt centerline. In order to increase a modulus the woven fabric may oriented on the belt so the included angle is bisected by a belt centerline. In the highest modulus orientation a warp yarn describes and angle of approximately 0° to a belt centerline, i.e., the fabric is oriented with a mill run direction aligned with a longitudinal axis of the belt.

An advantage of the inventive belt is ease of installation as well as reduced operating temperature. The belt may be installed on a belt drive system by simply stretching it over a pulley. This is considerably easier when compared to the known method of loosening a pulley, installing a belt and then readjusting the pulley to a proper operating preload position. It further eliminates the need for a belt tensioner in certain applications. This represents a considerable savings in time, parts and complexity.

Although a single form of the invention has been described herein, it will be obvious to those skilled in the art that variations may be made in the construction and relation of parts without departing from the spirit and scope of the invention described herein.

I claim:

1. A belt comprising:
an elastomeric body having a length and a centerline;
a tensile member embedded in the body;
the tensile member comprising a plurality of parallel warp yarns disposed in a warp direction and weft yarns disposed along a warp yarn length having a significantly lower denier than the warp yarns, the weft yarns having a spacing greater than the warp yarns;
the belt having an elongation of up to 6.8% of the length.

2. The belt as in claim 1, wherein the tensile member further comprises a pantograph form.

3. The belt as in claim 1, wherein the tensile member is substantially parallel to the belt centerline.

4. The belt as in claim 1 wherein the tensile member comprises polyamide 6.6.

5. The belt as in claim 1, wherein the warp yarn describing an angle to the centerline greater than 0°.

6. The belt as in claim 5 further comprising a second tensile member having a warp yarn having an opposite orientation to the tensile member thereby describing an included angle; and
the included angle in the range of 90° to 180°.

7. The belt as in claim 1 wherein the tensile member comprises polyamide 4.6.

8. The belt as in claim 7 further comprising: ribs having fibers embedded therein.

9. A belt comprising:
an elastomeric body having a length and a centerline;
a tensile member embedded in the body;
the tensile member comprising a plurality of parallel warp yarns disposed in a warp direction and weft yarns disposed along a warp yarn length having a significantly lower denier than the warp yarns, the weft yarns having a spacing greater than the warp yarns;
the belt having an elastic modulus of less than 1,200 N/mm relative to a belt width and measured in the longitudinal direction of the belt.

10. The belt as in claim 9, wherein the tensile member describing a pantograph form.

11. The belt as in claim 9, wherein the tensile member is substantially parallel to the belt centerline.

12. The belt as in claim 9, wherein the tensile member is substantially aligned with the belt centerline.

13. The belt as in claim 9 wherein the tensile member comprises polyamide 6.6.

14. The belt as in claim 9, wherein the warp yarn describing an angle to the belt centerline greater than 0°.

15. The belt as in claim 14 further comprising a second tensile member having a warp yarn having an opposite orientation to the tensile member thereby describing an included angle; and
the included angle in the range of 90° to 180°.

16. The belt as in claim 9 wherein the tensile member comprises polyamide 4.6.

17. The belt as in claim 16 further comprising: ribs having fibers embedded therein.

18. A belt comprising:
an elastomeric body having a length and a centerline, the elastomeric body having fibers disposed therein;
a tensile member comprising a woven material embedded in the body;
the tensile member comprises polyamide 4.6;
the tensile member comprising a plurality of parallel warp yarns disposed in a warp direction and weft yarns disposed along a warp yarn length having a significantly lower denier than the warp yarns, the weft yarns having a spacing greater than the warp yarns;
the belt having an elastic modulus of less than 1,500 N/mm relative to a belt width and measured in the longitudinal direction of the belt.

19. The belt as in claim 18, wherein the tensile member is substantially aligned with the belt centerline.

20. The belt as in claim 18, wherein the warp yarn describing an angle to the belt centerline greater than 0°.

21. The belt as in claim 20 further comprising a second tensile member having a warp yarn having an opposite orientation to the tensile member thereby describing an included angle; and
the included angle in the range of 90° to 180°.

* * * * *